(12) United States Patent
Song et al.

(10) Patent No.: US 9,315,278 B2
(45) Date of Patent: Apr. 19, 2016

(54) APPARATUS AND METHOD TO CONTROL TAKING AIRPORT BAGGAGE

(71) Applicant: ELECTRONICS AND TELECOMMUNICATIONS RESEARCH INSTITUTE, Daejeon (KR)

(72) Inventors: Jae-Gwan Song, Daejeon (KR); Dong-Ho Kim, Daejeon (KR); Dong-Gil Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 14/308,235

(22) Filed: Jun. 18, 2014

(65) Prior Publication Data
US 2015/0197348 A1    Jul. 16, 2015

(30) Foreign Application Priority Data
Jan. 15, 2014    (KR) ........................ 10-2014-0005211

(51) Int. Cl.
B65G 43/08    (2006.01)
B64F 1/36    (2006.01)

(52) U.S. Cl.
CPC ................ *B64F 1/368* (2013.01); *B64F 1/366* (2013.01); *B65G 43/08* (2013.01)

(58) Field of Classification Search
CPC .......... B64F 1/368; B64F 1/366; B65G 43/08
See application file for complete search history.

(56) References Cited

U.S. PATENT DOCUMENTS

| | | | | |
|---|---|---|---|---|
| 3,776,395 | A * | 12/1973 | Lingg | B64F 1/368 198/465.2 |
| 4,218,034 | A * | 8/1980 | Magill | 244/114 R |
| 5,748,737 | A * | 5/1998 | Daggar | 705/41 |
| 6,512,964 | B1 * | 1/2003 | Quackenbush et al. | 700/226 |
| 6,698,653 | B1 * | 3/2004 | Diamond et al. | 235/375 |
| 6,874,735 | B1 * | 4/2005 | Audyli | B64F 1/368 244/137.1 |
| 8,688,496 | B1 * | 4/2014 | Tansupaswatdikul | G06Q 10/08 705/338 |
| 2001/0032034 | A1 * | 10/2001 | Manabe | G06Q 10/08 700/225 |
| 2001/0052850 | A1 * | 12/2001 | Zimmerman | 340/572.1 |
| 2002/0134836 | A1 * | 9/2002 | Cash | G06Q 10/08 235/385 |

(Continued)

FOREIGN PATENT DOCUMENTS

| | | |
|---|---|---|
| KR | 10-2006-0093364 A | 8/2006 |
| KR | 10-2006-0130416 A | 12/2006 |

(Continued)

*Primary Examiner* — Daniel Walsh

(57) ABSTRACT

The present invention relates to an apparatus and method for taking airport baggage. In an embodiment of the present invention, there is provided a control apparatus for taking airport baggage comprising: a baggage information receiving part receiving baggage information in a tag from a tag reader which recognizes the tag attached to a baggage moving on a conveyor belt; a receipt information generating part generating receipt information with which a baggage owner is able to take the baggage on the basis of the baggage information; a receipt information providing part providing the receipt information to a terminal of the baggage owner; a movement request receiving part receiving a request for movement path of the baggage from the terminal of the baggage owner; and a movement controlling part moving the baggage to a particular location on the basis of the request for movement path of the baggage.

14 Claims, 5 Drawing Sheets

(56) References Cited

U.S. PATENT DOCUMENTS

| | | | |
|---|---|---|---|
| 2002/0169682 A1* | 11/2002 | Capek et al. | 705/26 |
| 2003/0061085 A1* | 3/2003 | Lanigan, Sr. | 705/8 |
| 2003/0100973 A1* | 5/2003 | Quackenbush et al. | 700/226 |
| 2003/0120510 A1* | 6/2003 | Panek | 705/1 |
| 2003/0154087 A1* | 8/2003 | Lewenstein | 705/1 |
| 2003/0189094 A1* | 10/2003 | Trabitz | B64F 1/368 235/385 |
| 2004/0019509 A1* | 1/2004 | Bekkers | G06Q 10/02 705/5 |
| 2004/0111279 A1* | 6/2004 | Schoen et al. | 705/1 |
| 2004/0199403 A1* | 10/2004 | Ananda | 705/1 |
| 2005/0216281 A1* | 9/2005 | Prior | G06Q 10/02 705/5 |
| 2006/0076397 A1* | 4/2006 | Langos | 235/375 |
| 2006/0210382 A1* | 9/2006 | Mountz | B60D 1/465 414/498 |
| 2007/0284481 A1* | 12/2007 | Linero | 244/137.1 |
| 2008/0204242 A1 | 8/2008 | Lee et al. | |
| 2009/0295544 A1* | 12/2009 | Bayer et al. | 340/10.1 |
| 2010/0012713 A1* | 1/2010 | Greene | G06K 19/086 235/375 |
| 2010/0259408 A1* | 10/2010 | Berger | 340/815.4 |
| 2010/0268450 A1* | 10/2010 | Evanitsky | G01C 21/3423 701/533 |
| 2011/0106445 A1* | 5/2011 | Mayer | G06Q 10/047 701/533 |
| 2011/0133904 A1* | 6/2011 | Warther | 340/10.5 |
| 2012/0056723 A1* | 3/2012 | Zhu | 340/10.1 |
| 2012/0068951 A1* | 3/2012 | Venkatasubramanian | G03B 21/14 345/173 |
| 2013/0214909 A1* | 8/2013 | Meijers et al. | 340/10.5 |
| 2013/0234849 A1* | 9/2013 | Gupta et al. | 340/539.11 |
| 2013/0241712 A1* | 9/2013 | Motley, III | G06K 7/10366 340/10.51 |
| 2015/0076280 A1* | 3/2015 | Cox | B64C 25/405 244/50 |
| 2015/0187232 A1* | 7/2015 | Bailiang | 701/532 |
| 2015/0197348 A1* | 7/2015 | Song | B65G 43/08 235/375 |
| 2015/0336753 A1* | 11/2015 | Lykkegaard | B64F 1/368 414/788.2 |

FOREIGN PATENT DOCUMENTS

| | | |
|---|---|---|
| KR | 10-2010-0097493 A | 9/2010 |
| KR | 10-2011-0072572 A | 6/2011 |
| KR | 10-2013-0050803 A | 5/2013 |
| KR | 10-2013-0095015 A | 8/2013 |
| WO | WO 2006/135134 A1 | 12/2006 |

* cited by examiner

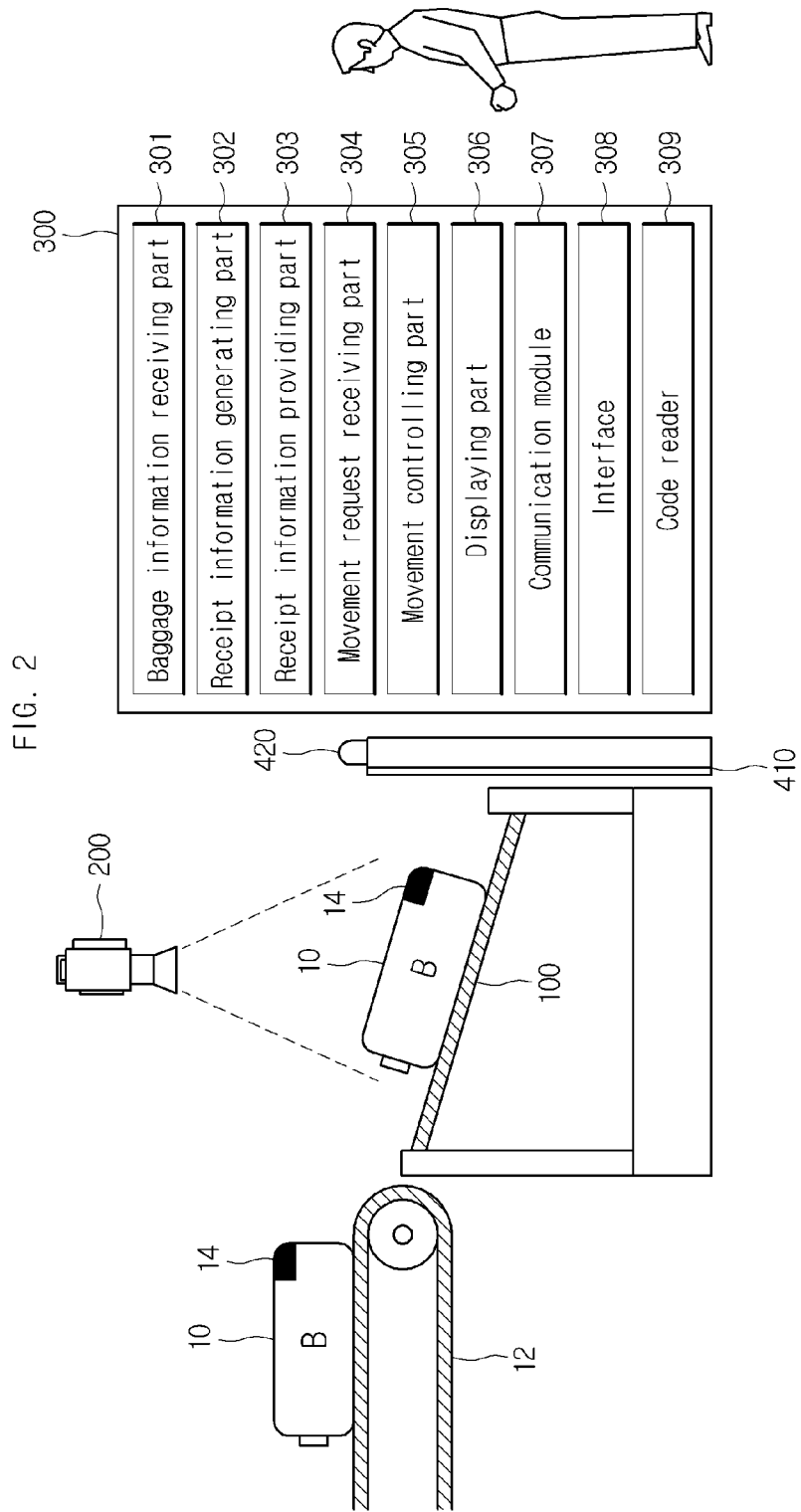

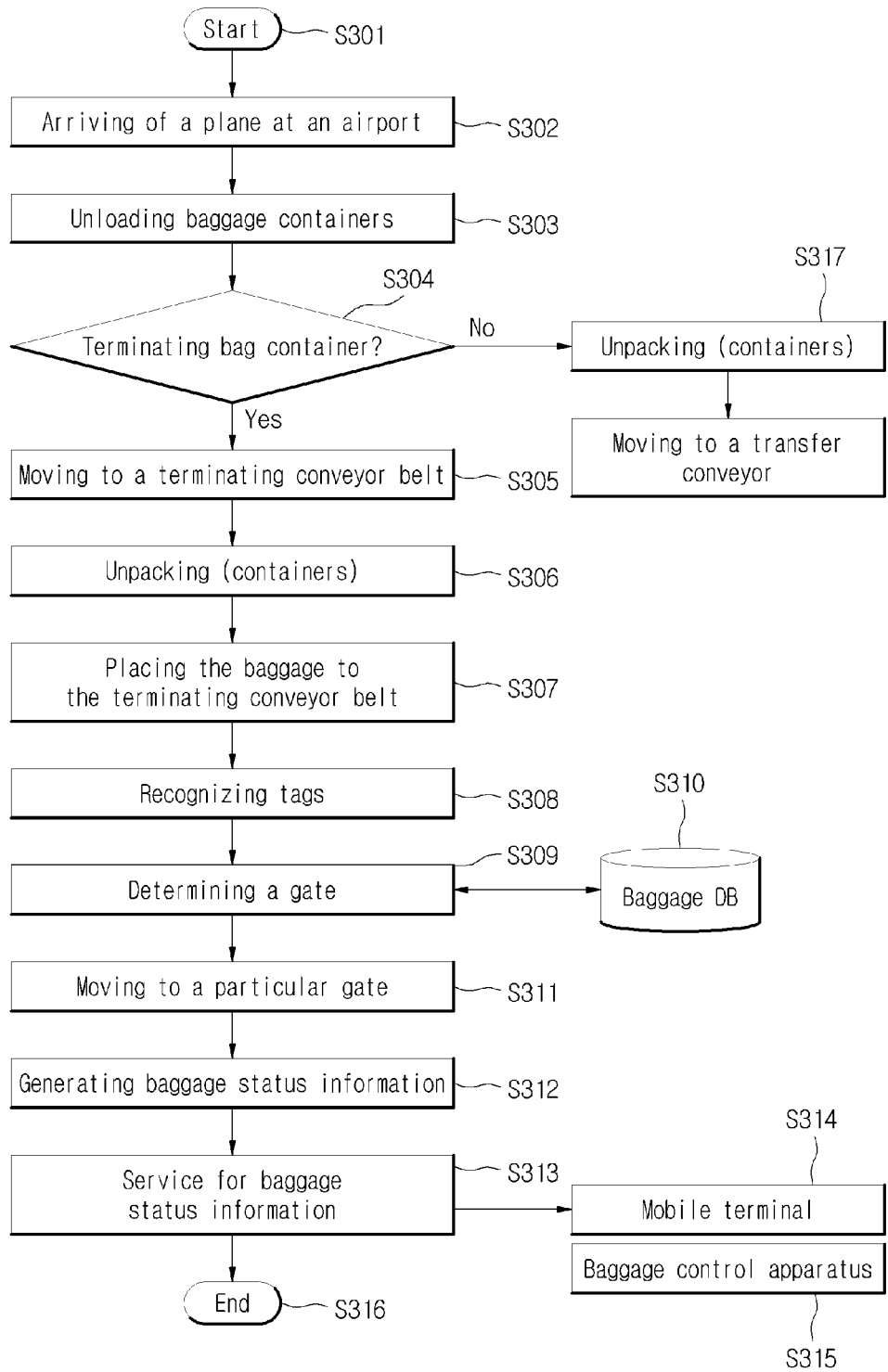

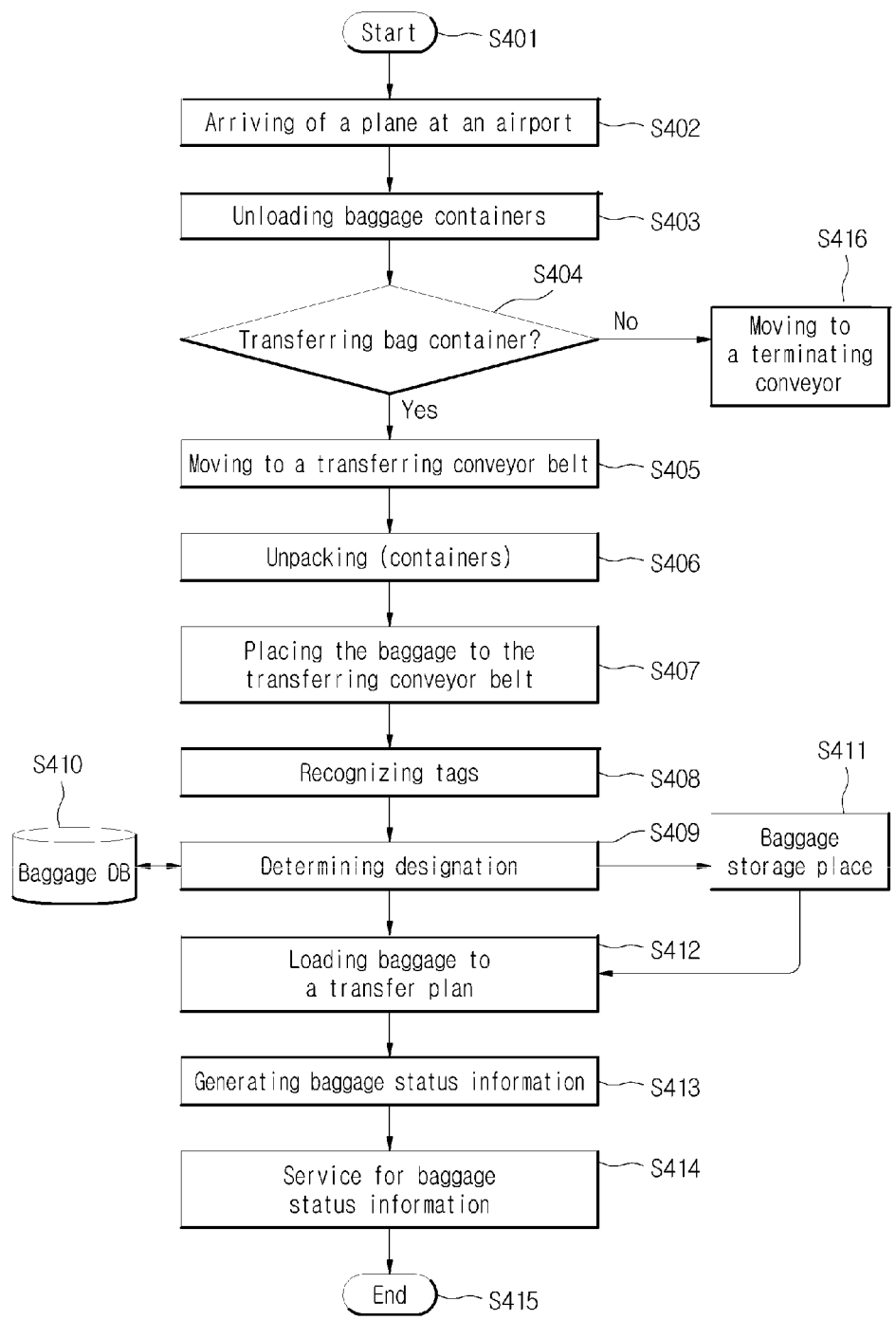

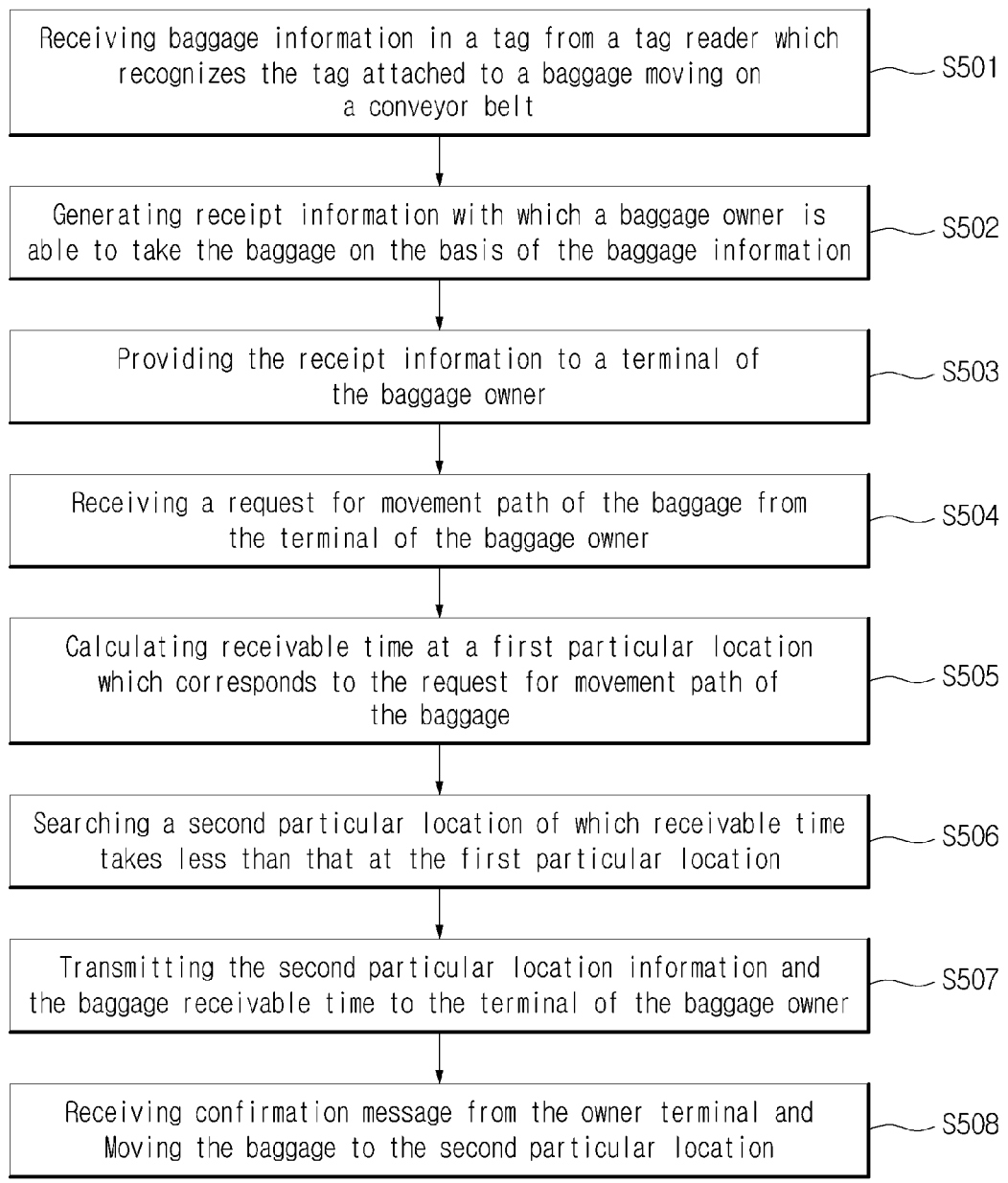

APPARATUS AND METHOD TO CONTROL TAKING AIRPORT BAGGAGE

CROSS REFERENCE TO RELATED APPLICATION

This application claims the benefit of Korean Patent Application No. 10-2014-0005211, filed on Jan. 15, 2014, entitled "Apparatus and method to control taking airport baggage", which is hereby incorporated by reference in its entirety into this application.

BACKGROUND OF THE INVENTION

1. Technical Field

The present invention relates to a control apparatus and method for taking airport baggage.

2. Description of the Related Art

Most of airports operate a baggage handling system to classify passenger baggage by airlines and deliver them quickly and accurately. Baggage can be analyzed as originating baggage, transferring baggage and terminating baggage. The baggage handling system is equipped with a bar code reader or a RFID reader to identify and automatically classify tags of baggage of which each is inputted to a system to handle the baggage to their designations.

The baggage arrived in an airport by a plane is divided into transferring baggage and terminating baggage and is unloaded from the plane. The transferring baggage are sent to a transferring baggage conveyor belt and each piece of the terminating baggage is sent to a terminating baggage conveyor inlet part to undergo security. The transferring baggage are then sent to their transfer planes and the terminating baggage are delivered quickly through conveyor lines.

Here, transferring passengers have to contact their onward airlines for checking well transferring of baggage and have had experienced with incorrect transfers many times. On the other hand, terminating passengers have no idea when their baggage come out from an outlet of baggage claim and have to check on baggage with the naked eye. Also there are risks of loss or injuries when baggage are taken from the rotating baggage claim belt.

SUMMARY OF THE INVENTION

An object of an embodiment of the present invention is to provide a control apparatus and method for taking airport baggage which is able to inform the location where baggage will arrive and time when baggage will be received in advance to a baggage owner.

Another object of an embodiment of the present invention is to provide a control apparatus and method for taking airport baggage in which a passenger is able to specify location and time to receive its baggage.

Still another object of an embodiment of the present invention is to provide a control apparatus and method for taking airport baggage which is able to provide transfer status in real time for comfortable transfer.

Still another object of an embodiment of the present invention is to provide a control apparatus and method for taking airport baggage which is able to prevent loss of baggage.

Still another object of an embodiment of the present invention is to provide a control apparatus and method for taking airport baggage which is able to increase speed of a conveyor belt for rapid baggage processing.

In an embodiment of the present invention, there is provided a control system for taking airport baggage comprising: a conveyor belt moving a baggage discharged from a baggage discharging part; a tag reader recognizing a tag attached to the baggage moving on the conveyor belt; and a control apparatus for receiving baggage information in the tag from the tag reader, generating receipt information on the basis of the baggage information, providing the receipt information to a terminal of the baggage owner, receiving a request for movement path of the baggage and moving the baggage to a particular location according to the request.

In an embodiment of the present invention, there is provided a control apparatus for taking airport baggage comprising: a baggage information receiving part receiving baggage information in a tag from a tag reader which recognizes the tag attached to a baggage moving on a conveyor belt; a receipt information generating part generating receipt information with which a baggage owner is able to take the baggage on the basis of the baggage information; a receipt information providing part providing the receipt information to a terminal of the baggage owner; a movement request receiving part receiving a request for movement path of the baggage from the terminal of the baggage owner; and a movement controlling part moving the baggage to a particular location on the basis of the request for movement path of the baggage.

In an embodiment of the present invention, the baggage information may comprise information for airlines and information for the baggage owner, and the receipt information may comprise information for a location where the baggage is received and information for time which takes to receive the baggage.

In another embodiment of the present invention, the request for movement path of the baggage may comprise a request for moving the baggage to a particular location for the owner to receive the baggage at the particular location, and a request for changing the requested particular location.

In still another embodiment of the present invention, the control apparatus for taking airport baggage may further comprise a displaying part displaying the baggage information and the receipt information, and may further comprise a communication module transmitting the receipt information to the terminal and receiving the request from the terminal. In still another embodiment of the present invention, the control apparatus for taking airport baggage may further comprise an interface for receiving a movement request of the baggage from the baggage owner, wherein the interface comprises at least one of a keyboard and a touch screen integrally combined to the displaying part.

In still another embodiment of the present invention, the control apparatus for taking airport baggage may further comprise a code reader recognizing at least one of a bar code and a QR code printed in a boarding pass of the owner. The control apparatus for taking airport baggage may further comprise a sliding door capable of opening for the owner of the baggage to receive the baggage when the baggage arrives at the particular location or closing after the owner takes the baggage. The control apparatus for taking airport baggage may further comprise a warning light indicating that the baggage owner is able to take the baggage with a predetermined color light.

In still another embodiment of the present invention, there is provided a control apparatus for taking airport baggage comprising: a transfer conveyor belt moving a transferring baggage discharged from an aircraft; a transfer tag reader recognizing a tag attached to the transferring baggage moving on the transfer conveyor belt; and a transferring baggage control apparatus receiving transferring baggage information in the tag from the transfer tag reader and moving the transferring baggage to a transfer plane by controlling the movement of the baggage.

In an embodiment, the transferring baggage information may comprise at least one of information for loading conditions of the plane of the transferring bag, information for transfer plane, information for transfer status and information for transfer time. The control apparatus for taking airport baggage may further comprise a transfer communication module transmitting the transferring baggage information to the terminal of the transferring baggage owner.

In another embodiment of the present invention, there is provided a control method for taking airport baggage comprising: receiving baggage information in a tag from a tag reader which recognizes the tag attached to a baggage moving on a conveyor belt; generating receipt information with which a baggage owner is able to take the baggage on the basis of the baggage information; providing the receipt information to a terminal of the baggage owner; receiving a request for movement path of the baggage from the terminal of the baggage owner; and moving the baggage to a particular location on the basis of the request for movement path of the baggage.

In an embodiment, the control method for taking airport baggage may further comprise calculating receivable time at a first particular location which corresponds to the request for movement path of the baggage; searching a second particular location of which receivable time takes less than that at the first particular location; transmitting the second particular location information and the baggage receivable time to the terminal of the baggage owner; and receiving confirmation message from the owner's terminal to move the baggage to the second particular location.

In another embodiment of the present invention, the control method for taking airport baggage may further comprise transmitting information, in which the baggage is able to be taken at a certain location, to the terminal of the baggage owner when the request for movement path of the baggage is not received from the terminal of the baggage owner.

According to further another embodiment of the present invention, there is provided a control method for taking airport baggage comprising: moving transferring baggage discharged from a plane by a transfer conveyor belt; recognizing a tag attached to the transferring baggage moving on the transfer conveyor belt by a transfer tag reader; and receiving transferring baggage information in the tag from the transfer tag reader and moving the transferring baggage by a transferring baggage control apparatus to a transfer plane by controlling the movement of the baggage.

In an embodiment, the control method for taking airport baggage may further comprise transmitting the transferring baggage information to a terminal of the transferring baggage owner by a transfer communication module.

The control apparatus and method for taking airport baggage according to an embodiment of the present invention is able to inform the location where baggage will arrive and time when baggage will be received in advance to a baggage owner.

The control apparatus and method for taking airport baggage according to another embodiment of the present invention allows for a passenger specify location and time to receive its baggage.

The control apparatus and method for taking airport baggage according to still another embodiment of the present invention is able to provide transfer status in real time for comfortable transfer.

The control apparatus and method for taking airport baggage according to still another embodiment of the present invention is able to prevent loss of baggage.

The control apparatus and method for taking airport baggage according to still another embodiment of the present invention is able to increase speed of conveyor belt for rapid baggage processing.

BRIEF DESCRIPTION OF THE DRAWINGS

FIG. 2 illustrates an internal configuration of a control apparatus for taking airport baggage according to an embodiment of the present invention.

FIG. 3 is a flowchart illustrating a control method for taking airport baggage according to an embodiment of the present invention.

FIG. 4 is a flowchart illustrating a method for processing transferring baggage in a control method for taking airport baggage according to an embodiment of the present invention.

FIG. 5 is a flowchart illustrating control method for taking airport baggage according to an embodiment of the present invention.

DESCRIPTION OF THE EXEMPLARY EMBODIMENTS

Figure 1:
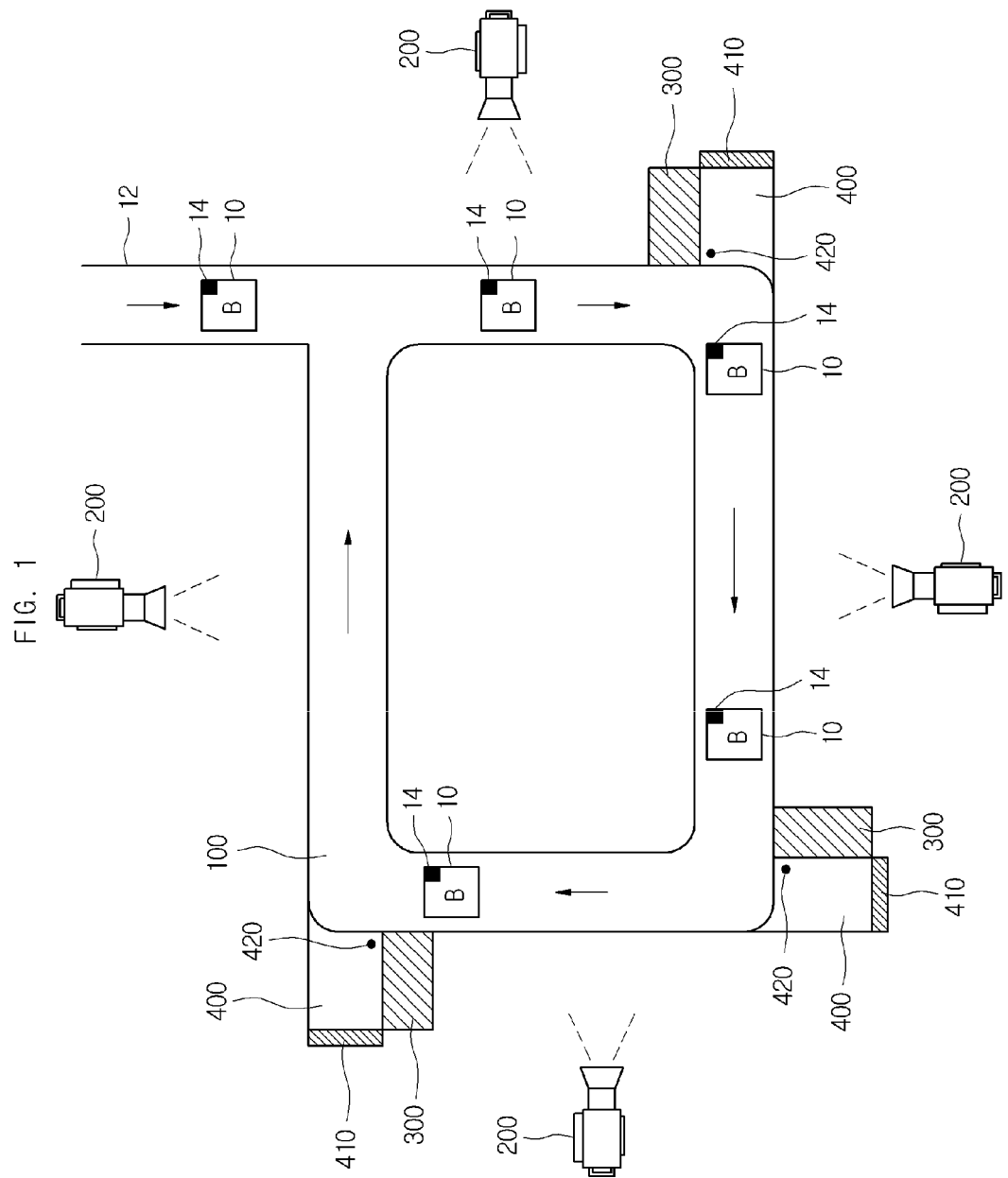
FIG. 1 illustrates a control system for taking airport baggage according to an embodiment of the present invention.

Objects and effects and technical constitutions to achieve them will become clear when referred to certain embodiments of the present invention which will be hereinafter described in detail with reference to the accompanying drawings. Throughout the description of the present invention, when describing a certain technology is determined to evade the point of the present invention, the pertinent detailed description will be omitted. The terms used in the description are terms which are defined in consideration of functions in the present invention and may vary with users' or operators' intention or practice.

However, it is to be appreciated that the present invention may not be limited to particular embodiments of the present invention which will be described below but various changes and modifications may be made by those skilled in the art. The exemplary embodiments of the present invention are provided to complete the disclosure of the present invention and fully inform the scope of the present invention to those who are skilled in the art. The present invention should be defined by the scope of the following claims and the definitions should be interpreted based on the entire description of the present invention.

Hereinafter, exemplary embodiments of the present invention will be described in more detail with reference to the accompanying drawings.

FIG. 1 illustrates a control system for taking airport baggage according to an embodiment of the present invention.

Referring to FIG. 1, a control system for taking airport baggage according to an embodiment of the present invention may comprise a conveyor belt 100, a tag reader 200 and a control apparatus for taking airport baggage 300.

The conveyor belt 100 may move a baggage 10 discharged from a baggage discharging part 12. The conveyor belt 100 may move the baggage 10 loaded in a plane into an airport through a baggage movement path when the plane arrives at the airport. The baggage 10 may be moved into the airport through the baggage discharging part 12 built inside the airport. For example, the baggage discharging part 12 may be connected to one side of the conveyor belt 100 and the baggage 10 discharged through the conveyor belt 100 may move on the conveyor belt 100 till a baggage owner takes the baggage 10.

The tag reader 200 may recognize a tag 14 attached to the baggage 10 moving on the conveyor belt 100. As shown in FIG. 1, the tag reader 200 may be installed at a position to recognize the tag 14 of the baggage 10 moving on the conveyor belt 100. In FIG. 1, the tag reader 200 is installed on each of left, right, top and bottom of the conveyor belt 100 but a plurality of tag readers may be installed according to size of an airport and volume of baggage.

Baggage information may be recorded in the tag 14 attached to the baggage 10 and may comprise information for plane and information for baggage owner. The information for plane may comprise departure time, arrival time, departure place and arrival place of plane. The information for baggage owner may comprise name, address and phone number of baggage owner. In an embodiment, the information for baggage owner may comprise information for the application running on a terminal of the baggage owner and information that can be connected to the application. The control apparatus for taking airport baggage 300 according to an embodiment of the present invention may transmit baggage information and receipt information to a terminal of the baggage owner using information for baggage owner.

The control apparatus for taking airport baggage 300 may receive the baggage information recorded in the tag 14 from the tag reader 200. The control apparatus for taking airport baggage 300 may generate receipt information on the basis of the baggage information and provide the receipt information to a terminal of the baggage owner. The baggage owner may receive the receipt information through the terminal and transmit a request for movement path of the baggage 10 to the control apparatus for taking airport baggage 300.

The control apparatus for taking airport baggage 300 may receive the request for movement path of the baggage 10 and move the baggage 10 to a particular location according to the request of the baggage owner. Here, the particular location may be a gate 400 provided on one side of the conveyor belt 100. In an embodiment, the baggage owner may specify a particular gate 400 while moving inside the airport. Information for the specified gate 400 may be displayed in the terminal of the owner and a display in the airport.

The baggage owner, when the plane arrives at the airport, may receive the information about the baggage 10 through the terminal device, specify the gate 400 using the received information, and receive the baggage 10 at the specified gate 400.

In an embodiment, the control apparatus for taking airport baggage 300 may be installed near the conveyor belt 100 or at a position which is spaced-apart from the conveyor belt 100. In another embodiment of the present invention, the control apparatus for taking airport baggage 300 may be also installed next to the specified gate 400 where the baggage owner can receive the baggage 10.

FIG. 2 illustrates an internal configuration of a control apparatus for taking airport baggage according to an embodiment of the present invention Referring to FIG. 2, the control apparatus for taking airport baggage 300 according to an embodiment of the present invention may comprise a baggage information receiving part 301, a receipt information generating part 302, a receipt information providing part 303, a movement request receiving part 304 and a movement controlling part 305.

The baggage information receiving part 301 may receive baggage information in a tag 14 from a tag reader 200 which recognize the tag attached to the baggage 10. As described above, the baggage information may comprise information for plane and information for baggage owner. The baggage information receiving part 301 may receive the baggage information through wire or wireless network.

The receipt information generating part 302 may generate receipt information for the baggage owner to receive the baggage 10 on the basis of the baggage information. As described above, the receipt information may comprise information for a location where the baggage is received and information for time which takes to receive the baggage. The information for a location, where the baggage is received, may comprise information for a location where it takes the least to receive the baggage 10 by considering the time for the baggage owner to receive the baggage 10. For example, the information for a location where the baggage 10 is received may comprise information for a gate number of which gate is provided on one side of the conveyor belt 100.

The receipt information providing part 303 may provide the receipt information to a terminal of the baggage owner. The baggage owner may receive information for a location where the baggage is received and information for time which takes to receive the baggage 10 through the terminal. The baggage owner may check information for a location where the baggage 10 arrives through the receipt information.

The movement request receiving part 304 may receive a request for movement path of the baggage from the terminal of the baggage owner. In an embodiment, the request for movement path of the baggage 10 may comprise a request for moving the baggage 10 to a particular location for the owner to receive the baggage at the particular location, and a request for changing the requested particular location.

The baggage owner may check the information for the arriving location of the baggage 10 through the receipt information and transmit a confirmation message for receiving the baggage 10. In another embodiment, the baggage owner may send a request for changing a location where the baggage 10 arrives. When the control apparatus for taking airport baggage 300 receives the request for changing a location where the baggage 10 arrives, it may move the baggage 10 to the requested location. The control apparatus for taking airport baggage 300 may provide information for the location to receive the baggage 10 to a terminal of the baggage owner. The information for the location to receive the baggage 10 may be provided in picture or photograph or in the form of an executable application on a terminal.

The movement controlling part 305 may move the baggage to a particular location based on the request for movement path of the baggage. The movement controlling part 305 may control the conveyor belt 100 and the gate 400 to move the baggage 10. Here, the movement controlling part 305 may control the speed of the conveyor belt 100 to move the baggage 10 to the gate 400 within the time to receive the baggage 10.

The control apparatus for taking airport baggage 300 according to an embodiment of the present invention may comprise a displaying part 306. The displaying part 306 may display baggage information and receipt information. The displaying part 306 may be provided integrally to the control apparatus for taking airport baggage 300 and display baggage information through a display unit. The display unit may be any one selected from a liquid crystal display (LCD), a single-chip digital light processing (DLP) projector, a three-chip digital light processing (DLP) projector, a cathode ray tube (CRT), a plasma display panel (PDP), a liquid crystal on silicon (LCS), a holographic images on transparent screen, an organic light emitting diode (OLED), and a LED display.

The control apparatus for taking airport baggage 300 according to an embodiment of the present invention may further comprise a communication module 307. The communication module 307 may transmit the receipt information to the terminal and receive a request for movement path of the baggage 10 from the terminal.

The communication module 307 may transmit the receipt information to the terminal through wire or wireless network and receive a request for movement path of the baggage 10 from the terminal. An example of the wireless network may include wireless LAN (WLAN), Wi-Fi, wireless broadband (Wibro), world interoperability for microwave access (Wimax), high speed downlink packet access (HSDPA), IEEE 802.16, long term evolution (LTE), wireless mobile broadband service (WMBS) and the like.

In addition, an example of near field communication technology may include Bluetooth, radio frequency identification (RFID), infrared data association (IrDA), ultra wideband (UWB), zigbee, near field communication (NFC), and the like. An example of wire network may include USB communication, ethernet, serial communication, optical/coaxial cable and the like.

The control apparatus for taking airport baggage 300 according to an embodiment of the present invention may further comprise an interface 308. The interface 308 may be mounted to the control apparatus for taking airport baggage or may be provided integrally to the control apparatus for taking airport baggage. The interface 308 may comprise at least one selected from a keyboard and a touch screen integrally combined to the displaying part.

The interface 308 may receive a request for moving the baggage 10 from the baggage owner. The baggage owner may check baggage information and receipt information through the displaying part 306 provided to the control apparatus for taking airport baggage 300 and input a request for movement path of the baggage through the interface 308. Further, the baggage owner may change the request for movement path of the baggage.

In another embodiment, the control apparatus for taking airport baggage 300 may further comprise a code reader 309 which recognizes at least one of a bar code and a Quick Response (QR) code printed in a boarding pass of the owner. The code reader 309 recognizes a bar code or a QR code printed in a boarding pass and move the baggage 10 which matches with the information recorded in a bar code or a QR code to the gate 400 where the control apparatus for taking airport baggage 300 is so that the owner is able to receive the baggage easily without inputting any instruction.

In addition, the control apparatus for taking airport baggage 300 according to an embodiment of the present invention may further comprise a sliding door 410 capable of opening for the owner of the baggage to receive the baggage 10 when the baggage 10 arrives at the gate 400 or closing after the owner takes the baggage 10 so that the baggage owner may receive the baggage 10 safely.

The control apparatus for taking airport baggage 300 may further comprise a warning light 420 indicating that the owner of the baggage 10 is able to take the baggage with a predetermined color light. For example, when the warning light is on in a red color, the baggage owner may wait until the baggage 10 arrives, or when the warning light is on in a blue color, the baggage owner may check if the sliding door 410 is opened and take the baggage 10.

The control apparatus for taking airport baggage 300 according to an embodiment of the present invention may also control movement of the transferring bag. The control apparatus for taking airport baggage 300 according to an embodiment of the present invention may comprise a transfer conveyor belt moving a transferring baggage discharged from an aircraft; a transfer tag reader recognizing a tag attached to the transferring baggage moving on the transfer conveyor belt; and a transferring baggage control apparatus receiving transferring baggage information in the tag from the transfer tag reader and moving the transferring baggage to a transfer plane by controlling the movement of the baggage.

The transferring baggage control apparatus may further comprise a transfer communication module transmitting transferring baggage information to a terminal of the transferring baggage owner. The transferring baggage information may comprise at least one selected from information for loading conditions of the plane of the transferring bag, information for transfer plane, information for transfer status and information for transfer time.

FIG. 3 is a flowchart illustrating a control method for taking airport baggage according to an embodiment of the present invention.

Referring to FIG. 3, in S302, a plane may arrive at an airport. After the plane arrives at the airport, baggage containers may be unloaded in S303.

In S304, it is determined if the baggage container is a terminating baggage container or a transferring baggage container and when it is determined as a transferring baggage container, the transferring baggage container may be unpacked and transferring baggage may be moved to a transfer conveyor belt.

In S304, when the baggage container is determined as a terminating baggage container, the terminating baggage container may be moved to a terminating conveyor belt in S305.

In S306, the terminating baggage container may be unpacked and terminating baggage may be moved to a conveyor belt in S307.

In S308, a tag attached to a baggage is recognized and in S309, a gate, where a baggage will be moved, may be determined. The gate where a baggage will be moved may be determined based on the time which takes the least for a baggage owner to receive his/her baggage.

In S310, information for the baggage may be stored in a baggage DB.

In S311, the baggage may be moved to a particular gate and in S312, information for baggage status may be generated. The information for baggage status may comprise information for a gate location where the baggage is received or for a current baggage location.

In S313, the information for baggage status may be provided as a service and in S314, the information for baggage status may be sent to a mobile terminal of a baggage owner and in S315, the information for baggage status may be sent to a baggage control apparatus.

FIG. 4 is a flowchart illustrating a method for processing transferring baggage in a control method for taking airport baggage according to an embodiment of the present invention.

Referring to FIG. 4, in S402, a plane may arrive at an airport. In S403, baggage containers may be unloaded. In S404, it is determined that the baggage container is a transferring baggage or not and when it is determined it is not a transferring bag, in S416, the baggage container may be moved to a conveyor belt 100.

In S404, when it is determined that the baggage container is a transferring bag, in S405, the baggage container may be moved to a transfer conveyor belt 100. In S406, the baggage container may be unpacked and in S407, the transferring baggage may be placed on the transfer conveyor belt 100.

In S408, the tag 14 attached to the transferring baggage may be recognized and in S409, designation of the transferring baggage may be determined. In S410, information for the designation may be stored in a baggage DB. In S411, the baggage may be stored in a storage place till the plane for correct designation departures.

In S412, the transferring baggage may be loaded to the designation plane and in S413, information for the transferring baggage may be generated. In S414, the information for the transferring baggage may be provided to a terminal of the transferring baggage owner or the transferring baggage control apparatus in the airport.

FIG. 5 is a flowchart illustrating control method for taking airport baggage according to an embodiment of the present invention.

Referring to FIG. 5, in S501, baggage information recorded in the tag 14 may be received from the tag reader 200 recognizing the tag 14 attached to the baggage 10 moving on the conveyor belt 100.

In S502, receipt information may be generated from the baggage owner to receive the baggage 10 on the basis of the baggage information.

In S503, the receipt information may be provided to the terminal of the baggage owner. In addition, when a request for movement path of the baggage 10 is not received from the terminal of the baggage owner after the receipt information is provided to the terminal of the baggage owner, information in which the baggage 10 is received at a certain location may be sent to the terminal of the baggage owner who did not receive the request for movement path of the baggage 10.

In S504, the request for movement path of the baggage 10 may be received from the terminal of the baggage owner. The baggage owner may input a gate number through the terminal and request for moving the baggage 10 to the inputted gate.

In S505, time to take the baggage 10 at a first particular location, which corresponds to the request for movement path of the baggage 10, may be calculated. The receivable time is time taking for the baggage 10 to move from the conveyor belt to the particular gate.

In S506, a second particular location, of which receivable time takes shorter than that for the first particular location, may be searched. For example, when it may take a long period of time to receive the baggage 10 at the location requested by the baggage owner due to changes in airport facilities or there may be another location where the baggage 10 is received faster, information for such a location may be provided to the baggage owner.

In S507, the information for the second particular location and time to receive the baggage 10 may be sent to the terminal of the baggage owner. The baggage owner may check the time to receive the baggage and determine the most appropriate location to the baggage owner.

In S508, the baggage 10 may be moved to the second particular location after receiving confirmation message from the owner terminal.

Methods or steps of algorisms described in conjunction with the above-mentioned exemplary embodiments can be implemented by hardware, a software module executed by a processor, or a combination thereof. The software module may be installed in a RAM memory, a flash memory, a ROM memory, an EPROM memory, an EEPROM memory, a register, a hard disk, detachable disk, a CD-ROM, or any storing medium well known to those who are skilled in the art. The storing medium may be connected with the processor and thus, the processor can read information from the storing medium and use the information to the storing medium. Alternatively, the storing medium can be integrated to the processor. The processor and the storing medium may be included in ASIC, which may be located within a user terminal. Alternatively, the processor and the storing medium may be included as additional components within a user terminal.

The above-mentioned processors may be implemented in one or more general-purpose or special purpose computers or software code modules executed by the processors, and be fully automated through the software code modules. The code modules may be stored in any type of computer readable media or other computer storing devices or the set of storing devices. Some or all of the methods may be implemented in specialized computer hardware.

The above-mentioned methods and tasks may be executed by a computer system and fully automated. The computer system may communicate through network to conduct the above-mentioned functions and include multiple individual computers which are interoperating and computing devices such as physical servers, workstations, storing arrays and the like. Each computing device generally includes program instructions stored in a memory or a non-transitory computer-readable storing medium or processors executing modules (or multi-processors or circuit or set of circuits such as modules). Some or all of the above-mentioned various functions may be implemented with application-specific circuits such as ASICs or FPGAs of a computer system. But the above-mentioned various functions may be implemented with such program instructions. When the computer system includes several computing devices, the devices may be positioned at the same place but it is not necessary. The above-mentioned methods and the results of the tasks may be stored permanently in different states by translating physical storing devices such as solid state memory chips and/or magnetic disks.

While the present invention has been described with reference to particular embodiments, it is to be appreciated that various changes and modifications may be made by those skilled in the art without departing from the spirit and scope of the present invention, as defined by the appended claims and their equivalents.

What is claimed is:

1. A control system for taking airport baggage comprising:
   a conveyor belt configured to move a bag discharged from a baggage discharging part;
   a tag reader configured to recognize a tag attached to the bag moving on the conveyor belt; and
   a control apparatus configured to receive baggage information in the tag from the tag reader, to generate receipt information on the basis of the baggage information, to provide the receipt information to a terminal of the baggage owner, to receive a request from the terminal of the baggage owner indicating a movement path of the bag, and to move the bag to a particular gate in an airport according to the request.

2. A control apparatus for taking airport baggage comprising:
   a baggage information receiving part configured to receive baggage information in a tag from a tag reader which recognizes the tag attached to a bag moving on a conveyor belt;
   a receipt information part configured to generate, on the basis of the baggage information, receipt information adapted to permit a baggage owner to take the bag;
   a receipt information providing part configured to provide the receipt information to a terminal of the baggage owner;
   a movement request receiving part configured to receive a request indicating a movement path of the bag from the terminal of the baggage owner; and a movement controlling part configured to move the bag to a particular gate in an airport on the basis of the request.

3. The control apparatus for taking airport baggage of claim 2, wherein the baggage information comprises airline information and baggage owner information.

4. The control apparatus for taking airport baggage of claim 2, wherein the receipt information comprises information indicating a location where the baggage is received and information indicating a time before the bag may be received.

5. The control apparatus for taking airport baggage of claim 2, wherein the request comprises a request to change the requested gate.

6. The control apparatus for taking airport baggage of claim 2, further comprising a part configured to display the baggage information and the receipt information.

7. The control apparatus for taking airport baggage of claim 2, further comprising a communication module configured to transmit the receipt information to the terminal and to receive the request from the terminal.

8. The control apparatus for taking airport baggage of claim 2, further comprising an interface configured to receive the request from the baggage owner,
wherein the interface comprises at least one of a keyboard and a touch screen integrally combined with the displaying part.

9. The control apparatus for taking airport baggage of claim 2, further comprising a code reader configured to recognize at least one of a bar code and a Quick Response (QR) code printed on a boarding pass of the owner.

10. The control apparatus for taking airport baggage of claim 2, further comprising a sliding door configured to open and close,
wherein the sliding door opens when the bag arrives at the particular gate, and closes after the owner takes the bag.

11. The control apparatus for taking airport baggage of claim 2, further comprising a warning light configured to indicate that the baggage owner is able to take the bag with a predetermined color light.

12. A control method for taking airport baggage comprising:
receiving baggage information in a tag from a tag reader which recognizes the tag attached to a bag moving on a conveyor belt;
generating, on the basis of the baggage information, receipt information adapted to permit a baggage owner is able to take the bag;
providing the receipt information to a terminal of the baggage owner;
receiving a request indicating a movement path of the bag from the terminal of the baggage owner; and
moving the bag to a particular gate in an airport on the basis of the request.

13. The control method for taking airport baggage of claim 12, wherein the particular gate is a first gate, the method further comprising:
calculating a first receivable time to move the bag to the first gate;
searching for a second gate corresponding to a second receivable time, the second receivable time being takes less than the first receivable time;
transmitting information on the second gate and the second receivable time to the terminal of the baggage owner; and
receiving a confirmation message from the owner's terminal to change the particular gate from the first gate to the second gate.

14. The control method for taking airport baggage of claim 12, further comprising:
transmitting information in which the bag is able to be taken at a certain location to the terminal of the baggage owner when the request for movement path of the baggage is not received from the terminal of the baggage owner.

* * * * *